United States Patent
Morishita

(10) Patent No.: US 6,527,074 B1
(45) Date of Patent: Mar. 4, 2003

(54) LUBRICATING STRUCTURE FOR A HYBRID VEHICLE

(75) Inventor: Naohisa Morishita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 108 days.

(21) Appl. No.: 09/715,078

(22) Filed: Nov. 20, 2000

(30) Foreign Application Priority Data

Nov. 25, 1999 (JP) ............................................ 11-335034

(51) Int. Cl.$^7$ ............................................... B60K 17/14
(52) U.S. Cl. .................... 180/65.1; 180/65.2; 180/65.3; 184/27.2
(58) Field of Search .............................. 180/65.1, 65.2, 180/65.3, 65.4, 65.6, 65.7, 69.6, 291, 306; 477/157, 5, 138; 184/27.2; 475/276, 5; 60/713

(56) References Cited

U.S. PATENT DOCUMENTS

| | | | |
|---|---|---|---|
| 5,415,603 A | * 5/1995 | Tuzuki et al. ................... | 477/5 |
| 5,799,744 A | 9/1998 | Yamaguchi et al. ........ | 180/65.2 |
| 5,823,282 A | 10/1998 | Yamaguchi ................ | 180/65.2 |
| 6,135,919 A | * 10/2000 | Skimakura ................... | 477/157 |
| 6,233,508 B1 | * 5/2001 | Deguchi et al. ............... | 701/22 |
| 6,253,137 B1 | * 6/2001 | Abo et al. ..................... | 701/51 |
| 6,278,280 B1 | * 8/2001 | Horie et al. ................. | 324/436 |
| 6,283,086 B1 | * 9/2001 | Yamamoto et al. .......... | 123/198 |
| 6,346,062 B1 | * 2/2002 | Shimabukuro et al. ........ | 477/5 |
| 6,359,404 B1 | * 3/2002 | Sugiyama et al. ........... | 318/432 |

FOREIGN PATENT DOCUMENTS

| | | | |
|---|---|---|---|
| EP | 0 764 799 A | 3/1997 | |
| EP | 0 908 343 A | 4/1999 | |
| EP | 0 926 401 A | 6/1999 | |
| JP | 10-324177 | * 8/1998 | ........... B60K/41/04 |
| JP | 10-324177 | 12/1998 | |

* cited by examiner

Primary Examiner—Brian L. Johnson
Assistant Examiner—J. Allen Shriver
(74) Attorney, Agent, or Firm—Armstrong, Westerman & Hattori, LLP

(57) ABSTRACT

In a hybrid vehicle comprising a CVT provided along a power train path between an engine and a drive wheel which operates on oil pressure from an oil pump and a starting clutch provided on a drive wheel side of the CVT, wherein the drive wheel can be driven by a secondary motor generator in the event that the power train path is interrupted by the starting clutch, a lubricating structure for a hybrid vehicle characterized in that an oil pump 4 adapted to be driven by the engine and an oil pump 25 adapted to be driven by a motor 26 are provided, a relief valve is provided on the oil pump 25 for governing the discharge pressure thereof, and that a drain circuit of the relief valve is connected to the CVT and a lubricating piping 22C of the secondary motor generator.

5 Claims, 3 Drawing Sheets

LUBRICATING STRUCTURE FOR A HYBRID VEHICLE

BACKGROUND OF THE INVENTION

1. Field of the Invention

The present invention relates to a lubricating oil for a hybrid vehicle and in particular to a lubricating structure for a hybrid vehicle that can run by an engine or a motor.

2. Description of the Related Art

For example, there has been disclosed a hybrid vehicle which is adapted to run by a driving motor disposed on an axle side of a transmission (JP-A-10-324177). In a hybrid vehicle of this type, there is provided a secondary oil pressure driving source in addition to a primary oil pressure supply source for driving the transmission when the engine is driven, and this secondary oil pressure driving source is selectively used in place of the primary oil pressure supply source when the engine is re-started from a state in which the engine is stopped.

Describing the related art hybrid vehicle with reference to FIG. 3, reference numeral 51 denotes a manual valve, which is a type of manual valve which is connected to a forward clutch 52 and a reverse clutch 53. Additionally, the manual valve 51 is connected via a check valve 54 to a primary oil pressure supply source X (not shown) which is driven by an engine, and a secondary oil pressure supply source Y is connected to a downstream side of the check valve 54 for supplying a hydraulic fluid to the manual valve 51 instead of the primary oil pressure supply source when the engine is stopped.

The secondary oil pressure supply source Y is intended to supply a hydraulic fluid to the manual valve 51 from a pump 56 which operates on a motor 55, and connected to a downstream side of the pump 56 along an oil pressure path are a relief valve 57 and a check valve 58. This relief valve 57 functions to set constant the pressure of a hydraulic fluid supplied from the pump 56, and a drain for the relief valve 57 is adapted to return to an oil pan 59.

However, with the above related art, when the driving motor is run at a high output or when the vehicle is run at high speed on continuous downward slopes with the stopped engine, since lubricating system oil is not sufficiently supplied from the primary oil pressure supply X, there occurs a shortage of lubricating oil at the transmission and the driving motor, probably leading to a drawback of the failure of the devices suffering from the oil shortage. In other words, with the secondary oil pressure supply source Y which is inferior to the primary oil pressure supply source X in the provision of a needed flow rate, when an excess lubricating oil from the secondary oil pressure supply source Y is returned from the relief valve 57 to the oil pan 59, there occurs a shortage of lubricating oil that is to be supplied to the lubricating system.

SUMMARY OF THE INVENTION

To cope with this problem, an object of the invention is to provide a lubricating structure for a hybrid vehicle which can eliminate a shortage of lubricating oil while the secondary oil pressure supply source Y is in use.

With a view to solving the above problem, according to an aspect of the invention, in a hybrid vehicle comprising a transmission (for example, a CVT 6 in an embodiment of the invention) provided along a power train path between an engine (for example, an engine E in the embodiment) and a drive wheel (for example, a drive wheel W in the embodiment) which operates on oil pressure from an oil pressure supply source (for example, oil pumps 4, 25 in the embodiment) and a clutch (for example, a start clutch 15 in the embodiment) provided on a drive wheel side of the transmission, wherein the drive wheel can be driven by an electric motor (for example, a secondary motor generator M2 in the embodiment) in the event that the power train path is interrupted by the clutch, there is provided a lubricating structure for a hybrid vehicle characterized in that the oil pressure supply source is constituted by a primary oil pressure supply source (for example, mainly the oil pump 4 in the embodiment) adapted to be driven by the engine and a secondary oil pressure supply source (for example, mainly the oil pump 25 in the embodiment) adapted to be driven by any other drive source (for example, a motor 26 in the embodiment) than the engine, that a relief valve (for example, a relief valve 28 in the embodiment) is provided on the secondary oil pressure supply source for regulating a discharge pressure, and that a drain circuit (for example, a drain circuit 29 in the embodiment) of the relief valve is connected to a lubricating oil path (for example, a lubricating piping 22c) for the transmission and the electric motor.

According to the lubricating structure, an excess oil from the drain circuit of the secondary oil pressure supply source is supplied to lubricate the transmission and the electric motor.

DETAILED DESCRIPTION OF THE PREFERRED EMBODIMENTS

Referring to the accompanying drawings, an embodiment of the invention will be described below.

Figure 2:
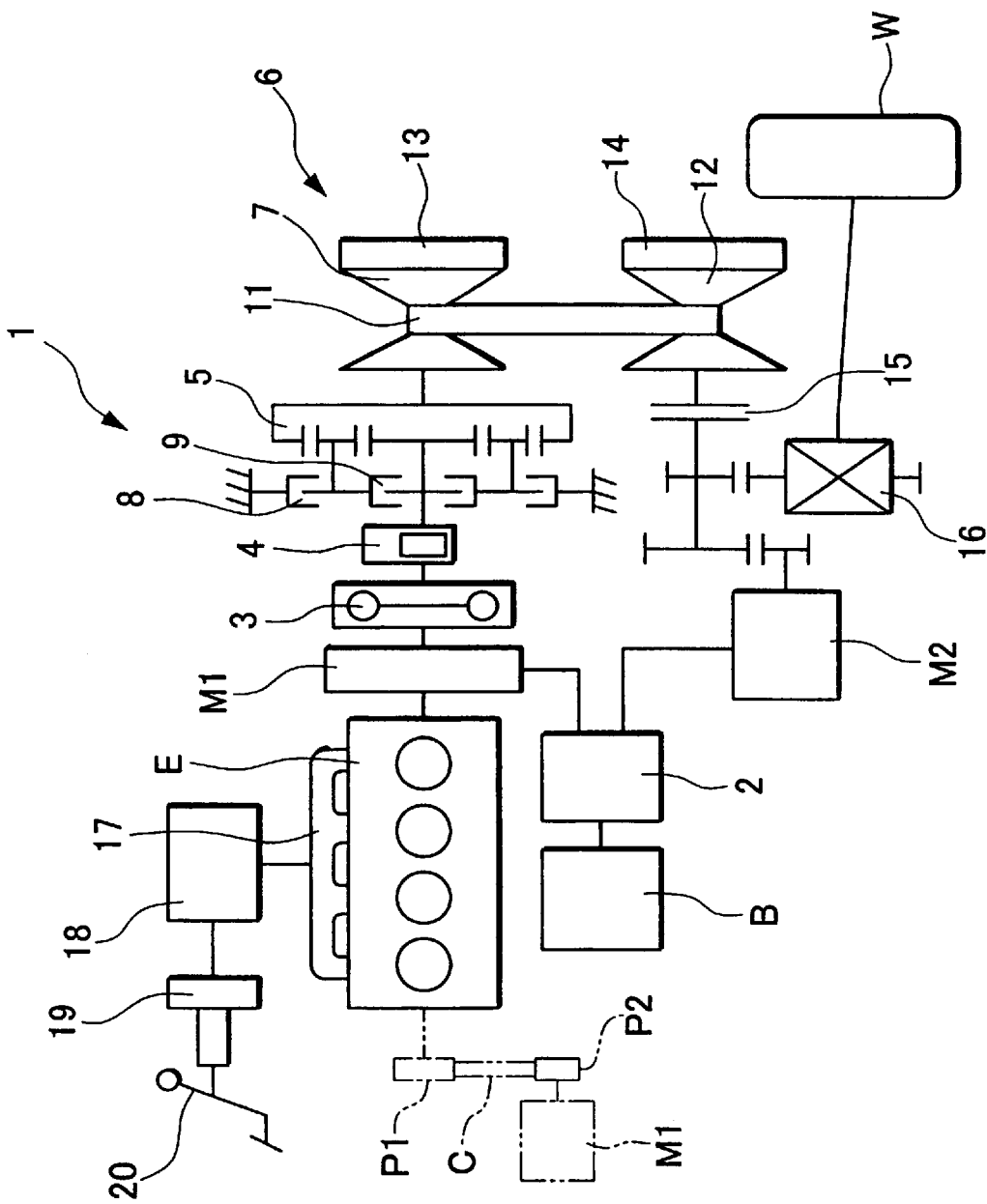
FIG. 2 is a diagram showing the overall construction of the first embodiment of the invention.
Figure 3:
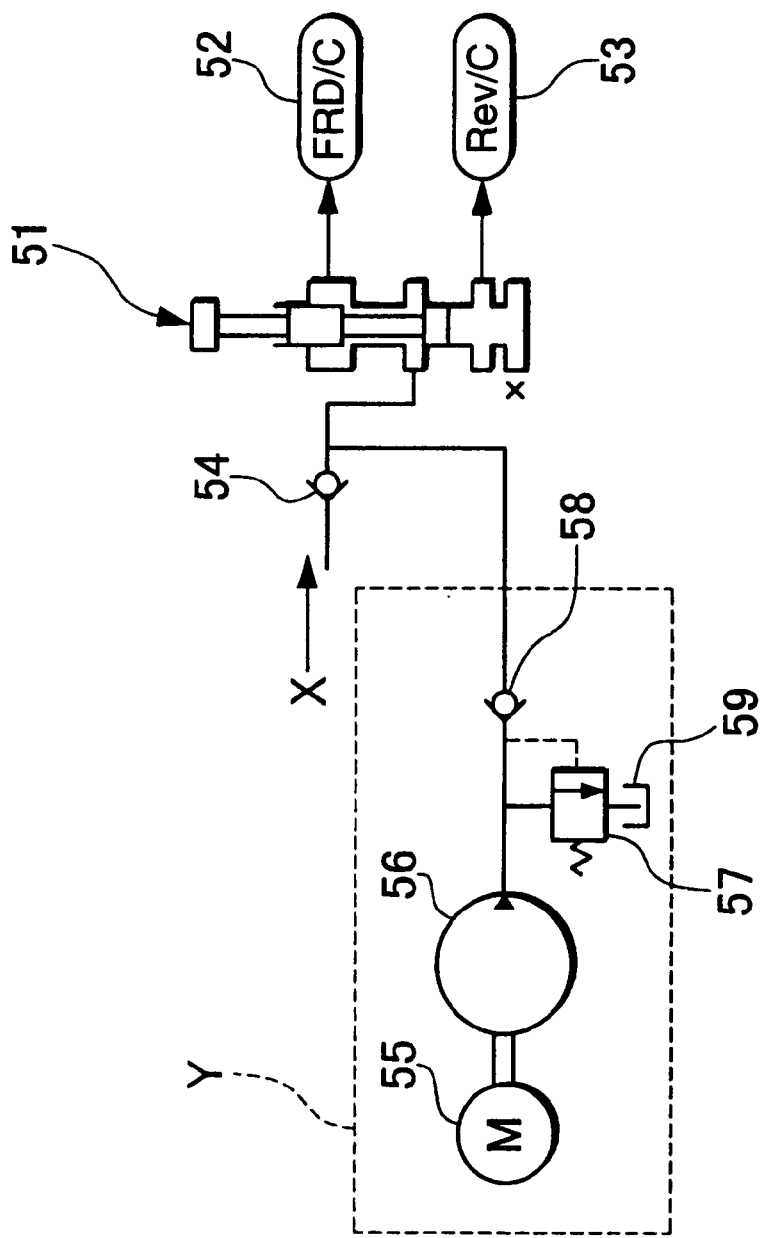
FIG. 3 is an explanatory view showing a main hydraulic circuit of a conventional lubricating structure.

FIG. 2 is a schematic diagram showing the construction of a hybrid vehicle according to an embodiment of the invention.

In FIG. 2, a hybrid vehicle 1 includes a control unit (not shown), and an engine E is started by a primary motor generator M1 connected to the engine E, and power is generated using the engine as a power source therefor so as to keep a battery B charged. Note that this primary motor generator M1 also assists in driving the engine E when a sufficient driving force cannot be obtained through a cooperation of a secondary motor generator M2, which will be described later and the engine E.

Additionally, in the hybrid vehicle 1, since an output shaft of the engine E is directly connected to a rotating shaft of the primary motor generator M1, as was described before, the primary motor generator M1 can be used as a starter when starting the engine E. Note that a power drive unit 2 is provided between the primary motor generator M1 and a battery B.

The output shaft of the engine E and the rotating shaft of the primary motor generator M1 which is connected thereto are constructed so as rotate a dual-mass flywheel 3 and to rotatively drive an oil pump 4. Additionally, the output shaft of the engine E and the rotating shaft of the primary motor generator M1 are connected to a drive pulley 7 of a CVT 6 via a forward and backward movement switching planetary gear 5.

The forward and backward movement switching planetary gear 5 is constructed so as to selectively engage with hydraulically operated friction elements 8, 9 through a pressure governing valve (a pressure governing valve 22 shown in FIG. 1 which will be described later) connected to a selector ever by manipulating the selector lever as required.

Thus, the rotating directions of power provided by the engine E or the primary motor generator M1 which is inputted in the drive pulley 7 of the CVT 6 are designed to be switched.

The rotation of the drive pulley 7 is transmitted to a driven pulley 12 via a metallic belt 11. Here the rotation ratio of the drive pulley 7 and driven pulley 12 is determined by diameters of portions of the respective pulleys around which the metallic belt 11 is wound, and the belt wound-around diameters are controlled by pressing forces applied by oil pressures imparted to side chambers 13, 14 of the respective pulleys.

Note that the oil pressures are generated by the oil pump 4 to be supplied to the respective side chambers 13, 14. Additionally, the rotation of the driven pulley 12 is transmitted to the drive wheel W via a starting clutch 15 and a differential 16.

An intake manifold 17 of the engine E is connected via a vacuum tank 18 to a brake booster 19 connected to a brake pedal 20.

Then, provided on the power drive unit 2 is a secondary motor generator M2, which is connected to the drive wheel W via the differential 16. Consequently, this hybrid vehicle is constructed so as to perform a motor running through the secondary motor generator M2 in a state in which the power transmission from the engine is interrupted by the starting clutch 15. In addition, the deceleration regeneration and the driving assistance to the engine E are provided by the secondary motor generator M2.

Figure 1:
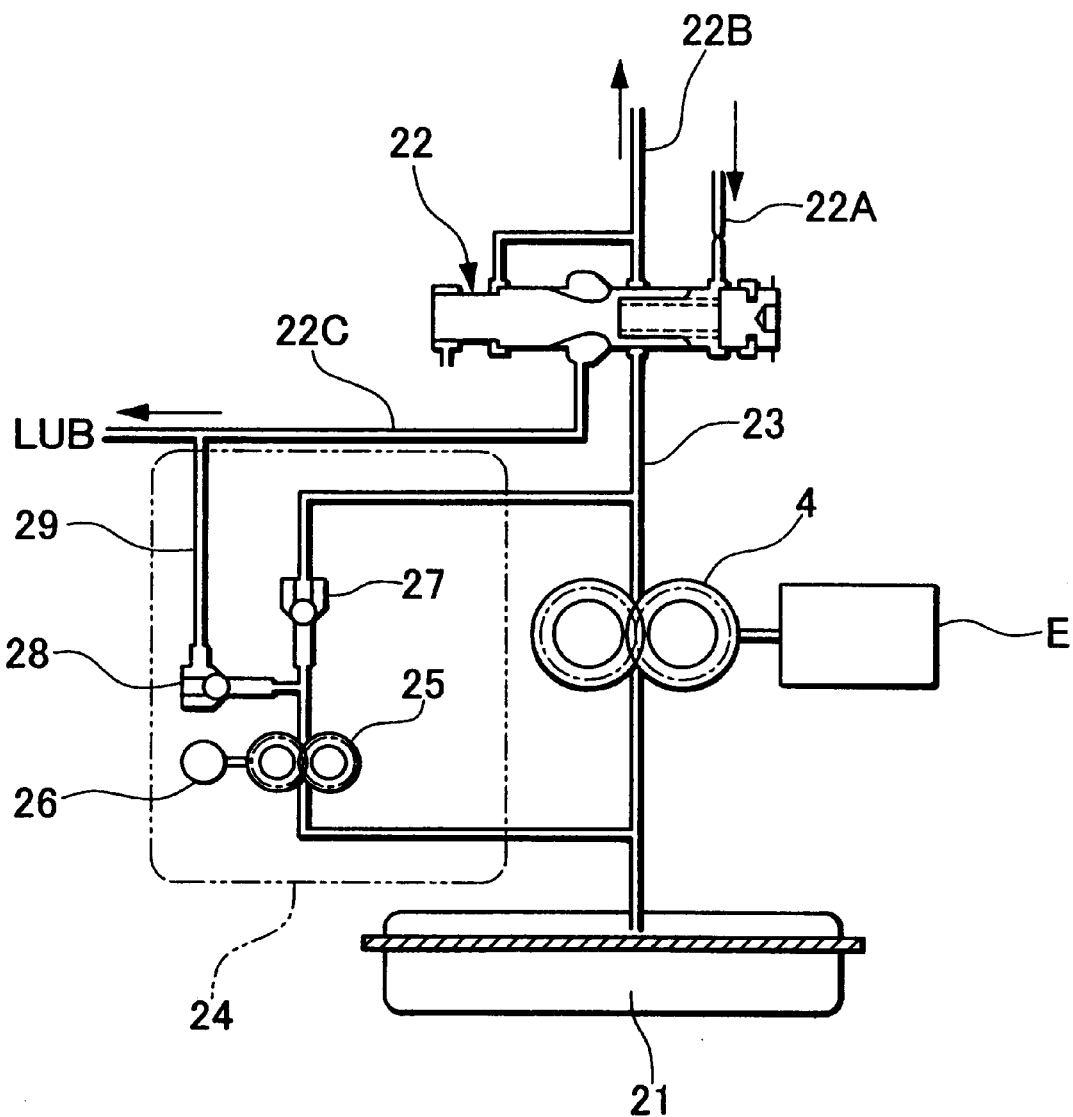
FIG. 1 is an explanatory view showing a main hydraulic circuit of a first embodiment of the invention.

FIG. 1 is a hydraulic circuit diagram showing a main part of the invention.

In FIG. 1, reference numeral 21 denotes an oil pan, and the oil pump 4 driven by the engine E is provided along a hydraulic circuit 23 extending from the oil pan 21 to the pressure governing valve 22. A control piping 22A for controlling the operation of the pressure governing vale 22 is connected to the pressure governing valve 22, and an operating piping 22B for applying an operation pressure from the oil pump 4 thereto is also connected to the pressure governing valve 22. Additionally, a lubricating piping 22C for lubricating the CVT 6 and the secondary motor generator M2 is also connected to the pressure governing valve 22. To be specific, the pressure governing valve 22 is designed to govern the pressure of the operating piping 22B from the hydraulic circuit 23 with a pressure in proportion to an oil pressure applied to the controlling pipe 22A. A hydraulic fluid which becomes extra at the time of governing the pressure is relieved to be discharged into the lubricating piping 22C for use for lubrication (LUB).

A hydraulic circuit 24 is provided in parallel with the hydraulic circuit 23. An oil pump 25 is provided along the hydraulic circuit 24, which has a similar function as that provided along the hydraulic circuit 23. The oil pump 25 is driven by a motor 26 and is intended to supply a hydraulic fluid to the CVT 6 instead of the oil pump 4 when the engine is at a halt.

A one-way valve 27 is interposed along the hydraulic circuit 24, and a relief valve 28 is provided between the one-way valve 27 and the oil pump 25. A drain circuit 29 of the relief valve 28 is connected to the lubricating piping 22C, which is connected to the pressure governing valve 22.

According to the above embodiment, in a case where the engine E is driven, when a hydraulic fluid is supplied to the pressure governing valve 22 from the oil pan 21 by means of the oil pump 4, the pressure governing valve 22 is controlled by the hydraulic fluid from the controlling piping 22A, and the hydraulic fluid having a predetermined pressure is supplied from the operating piping 22B to the predetermined side chambers 13, 14 of the CVT 6.

Then, while the hydraulic fluid is being supplied as described above, the hydraulic fluid is distributed to the CVT 6 and the secondary motor generator M2 from the pressure governing valve 22 via the lubricating piping 22C as a lubricating oil. Here, when the running of the vehicle by the secondary motor generator M2 starts with the engine E being stopped, since the oil pump 4 stops, the oil pump 25 is then started to operate by the motor 26. The supply of the hydraulic fluid to the CVT 6 or the like is secured by the oil pump 25.

The relief valve 28 is provided along the hydraulic circuit 24 through which the hydraulic fluid is carried by means of the oil pump 25, but since the drain circuit 29 of the relief circuit 28 is not connected to the oil pan 21 but to the lubricating piping 22C, the hydraulic fluid draining from the relief valve 28 is sent to the lubricating piping 22C for use for lubrication.

Consequently, even in a case where the secondary motor generator M2 is operated at a high output while the engine is in a stopped condition, or in a case where the vehicle runs at high speed on continuous downward slopes with the stopped engine, the loss of lubricating oil at the CVT 6 and the secondary motor generator can be prevented.

Note that the invention is not limited to the above embodiment. As shown in FIG. 2 by dotted lines as another embodiment, the invention can be applied to a hybrid vehicle in which a first motor generator M1 is connected via a chain C and pulleys P1, P2 to an end of an engine E opposite to an end where a dual-mass flywheel of a crankshaft is provided. With this embodiment, similar advantages provided with the previous embodiment can be provided.

As has been described heretofore, according to the aspect of the invention, while the vehicle is running by driving the drive wheel by the electric motor with the engine being stopped, an excess fluid from the drain of the relief valve of the secondary oil pressure supply source is supplied for the lubrication of the transmission and the electric motor, and therefore with the invention, there is advantageously caused no risk of the loss of lubricating oil at the transmission and the electric motor that would take place in the event that the draining fluid from the relief valve is returned to the oil pan.

What is claimed is:

1. A lubricating structure for a hybrid vehicle including a transmission disposed along a power train path between an engine and a drive wheel and an electric motor capable of driving the drive wheel in a state that the engine is stopped, the lubricating structure comprising:

a primary oil pressure supply source driven by the engine;

a pressure governing valve governing oil pressure from the primary oil pressure supply source to supply operation oil into the transmission, and discharging an extra oil at the time of governing pressure into a lubrication oil path for at least one of the transmission and the electric motor;

a secondary oil pressure supply source driven by a drive source different from the engine, the primary and secondary oil pressure supply source supplying oil pressure into the transmission; and a relief valve provided on the secondary oil pressure supply source for governing the discharge pressure thereof, wherein a drain circuit of the relief valve is connected to the lubricating oil path.

2. A lubricating structure for a hybrid vehicle according to claim 1, further comprising:

a one-way valve provided on the secondary oil pressure supply source and connected to a hydraulic circuit between the pressure governing valve and the primary oil pressure supply source.

3. A lubricating structure for a hybrid vehicle according to claim 2, wherein the relief valve is disposed between the secondary oil pressure supply source and the one-way valve.

4. A lubricating structure for a hybrid vehicle according to claim 2, wherein the pressure governing valve is connected to the lubricating oil path for the transmission and the electric motor.

5. A lubricating structure for a hybrid vehicle according to claim 1, wherein the primary and secondary oil pressure supply sources are respectively formed by oil pumps.

* * * * *